United States Patent
Pizanti et al.

[11] Patent Number: 6,113,083
[45] Date of Patent: Sep. 5, 2000

[54] ANTI-VIBRATION SUPPORT

[75] Inventors: Thierry Pizanti, La Ferte Villeneuil; Loïc Collet, Gohory, both of France

[73] Assignee: Hutchinson, Paris, France

[21] Appl. No.: 09/314,254

[22] Filed: May 18, 1999

[30] Foreign Application Priority Data

May 28, 1998 [FR] France .................................. 98 06723

[51] Int. Cl.[7] ..................................................... F16F 5/00
[52] U.S. Cl. .................................. 267/140.12; 267/141.2; 267/140.13
[58] Field of Search .......................... 267/140.1, 140.3, 267/140.4, 140.5, 140.12, 219, 140.13, 141.2, 141.3, 141.4, 141.5; 248/562, 636, 638

[56] References Cited

U.S. PATENT DOCUMENTS

| | | | |
|---|---|---|---|
| 2,535,080 | 12/1950 | Lee | 248/22 |
| 4,262,886 | 4/1981 | Le Salver et al. | 267/8 R |
| 4,767,106 | 8/1988 | Le Fol | 267/140.1 |
| 5,413,374 | 5/1995 | Pierce | 267/141.2 |
| 5,741,001 | 4/1998 | Bellamy et al. | 267/140.12 |
| 5,855,352 | 1/1999 | Bellamy et al. | 267/140.12 |
| 5,855,364 | 1/1999 | Reh et al. | 267/140.13 |
| 6,019,342 | 2/2000 | Pelle | 248/562 |

FOREIGN PATENT DOCUMENTS

| | | |
|---|---|---|
| 0 012 638 | 6/1980 | European Pat. Off. . |
| 0 800 017 | 10/1997 | European Pat. Off. . |
| 2 726 339 | 5/1996 | France . |

OTHER PUBLICATIONS

French Preliminary Search Report dated Feb. 10, 1999, French Appl. No. FR 9806723.

*Primary Examiner*—Robert J. Oberleitner
*Assistant Examiner*—Devon Kramer
*Attorney, Agent, or Firm*—Marshall, O'Toole, Gerstein, Murray & Borun

[57] ABSTRACT

Anti-vibration support comprising two rigid armatures connected to each other by an elastomer body which has, on the one hand, a bell-shaped side wall and on the other hand, a central foot extending inside the side wall from the top of the elastomer body to a baseplate forming one of the armatures. The side wall has vertical reinforcement ribs which extend radially outwards and which are adapted to prevent the central foot from keeling over.

16 Claims, 3 Drawing Sheets

ANTI-VIBRATION SUPPORT

FIELD OF THE INVENTION

The present invention relates to anti-vibration supports.

More particularly, the invention concerns an anti-vibration support intended to be interposed between two rigid components to dampen and attenuate vibrations between these two components along a vertical central axis and to support a continuous vertical load, exerted by one of these two components, this support comprising:

first and second rigid armatures, intended to be fixed respectively to the two rigid components to be connected, and an elastomer body connecting the two armatures to each other, this elastomer body having a bell-shaped side wall extending axially by diverging from a top integral with the first armature to an annular base integral with the second armature, a rigid baseplate integral with the second armature extending to the centre of said annular base.

BACKGROUND OF THE INVENTION

The document FR-A-2 726 339 (see FIGS. 13 to 15) describes an anti-vibration support of this type, in which the elastomer body side wall comprises on the one hand, two relatively slender mutually opposite faces, of low axial resistance, and on the other hand, two less slender mutually opposite faces, which take up the continuous vertical load.

In this known anti-vibration support, the two slender faces help to reduce the dynamic rigidity of the support, particularly in respect of relatively high frequency vibrations (above 20 Hz and for example around 150 Hz).

OBJECTS AND SUMMARY OF THE INVENTION

The anti-vibration support disclosed in the above-mentioned document is quite satisfactory, but does however have the drawback that the forces stemming from the flexibility of the slender faces of the side wall are impeded by the relatively thick and rigid faces of said side wall.

One solution to this technical problem has already been proposed in French patent application FR-A-2 756 342, filed on Nov. 28, 1996 and published after the priority date of the present patent application.

In this solution, the elastomer body comprises a central foot taking up the bulk of the continuous vertical load, a fact which allows the flexibility of the whole elastomer side wall to be increased, so as to better absorb the acoustic vibrations.

There seemed to be some value in further improving on this technical solution, in order to ensure that the central foot cannot keel over, or at the very least may find it difficult to keel over.

To this end, according to the invention, an anti-vibration support of the kind described in the document FR-2 726 339 is essentially characterised in that the elastomer body comprises a central foot extending vertically to the centre of the side wall from the first armature to the contact with the baseplate, and in that said elastomer body side wall is more flexible than the central foot in the vertical direction, this side wall comprising from 2 to 6 reinforcement ribs which extend radially outwards each in a vertical plane and which are distributed angularly around the side wall, these reinforcement ribs being separated from each other by thinner and flexible portions belonging to said side wall.

By means of these arrangements, the elastomer body side wall can have great overall flexibility, since the major part of the continuous vertical load can be taken up by the central foot.

This flexibility gives the anti-vibration support low dynamic rigidity in respect of vibrations of relatively small amplitude (for example, less than 1 mm) and relatively high frequency (for example, above 20 Hz and particularly about 150 Hz).

The result is very good absorption of these high frequency vibrations, therefore better acoustic isolation between the first and second rigid components connected by the anti-vibration support.

Lastly, the reinforcement ribs of the side wall make it possible to reduce the risk of seeing the central foot keel over under the combined effect of the continuous vertical load and relative horizontal movements between the first and second rigid components.

In preferred versions of the invention, use may possibly be made additionally of one and/or the other of the following arrangements:

the reinforcement ribs are sized so as to prevent the central foot from keeling over without markedly increasing the vertical rigidity of the support;

the central foot is sized so as not to buckle when the continuous vertical load is applied to the anti-vibration support, the elastomer body side wall being sized to withstand buckling when the anti-vibration support bears said continuous vertical load and in this event to have approximately zero rigidity in the vertical direction;

each of the reinforcement ribs extends between, on the one hand, an upper end integral with the top of the side wall, and on the other hand, a lower end which is fixed to the second armature;

each reinforcement rib is sized so that, when the anti-vibration support bears the continuous vertical load, the upper end of said rib bends with a tendency to roll up partially on itself to dip towards the second armature;

each reinforcement rib is sized so that, when the anti-vibration support bears the continuous vertical load, the upper end of said reinforcement rib forms locally an acute angle with the central axis, near the top of the side wall;

the elastomer body side wall has an inner surface extending at an angle radially outwards and downwards from the central foot of the elastomer body, and each reinforcement rib has a vertical thickness, between said inner surface and the upper end of said reinforcement rib, which increases radially outwards from the central foot;

at least one of the reinforcement ribs has a stop face which is orientated radially outwards, this stop face being adapted to engage with a rigid counter stop which is integral with the second armature;

the central foot of the elastomer body has vertical ribs distributed angularly around said foot, which project radially outwards;

each vertical rib of the foot extends from the top of the elastomer body side wall to the baseplate;

the vertical ribs of the central foot are placed in correspondence with the reinforcement ribs of the elastomer body side wall;

the baseplate forms an upwardly open trough which receives the central foot of the elastomer body, this central foot being centred in the trough by means of said vertical ribs;

the central foot extends upwards with its vertical ribs beyond the top of the elastomer body side wall, as far as the first armature;

the elastomer body side wall delimits a work chamber which communicates, by means of a choked passage, with a surge chamber delimited by a flexible wall, the work chamber forming with the surge chamber and the choked passage a sealed volume filled with liquid;

the baseplate forms the second armature and the elastomer body includes the flexible wall of the surge chamber, which is formed in a single piece with the bell-shaped side wall and the central foot, this elastomer body being applied in a sealed way against the baseplate so as to delimit with it the work chamber, the surge chamber and the choked channel;

this central foot constituting the above-mentioned support part and having, between the first armature and the baseplate, a certain free height h and a certain equivalent diameter d such that the h/d ratio is less than 2·5 (the equivalent diameter d may be either the average diameter of the central foot if this central foot is shaped to be of cylindrical revolution, or, more generally, have the value d=2 (S/π)/2, where S is the average area of the horizontal section of the central foot.

BRIEF DESCRIPTION OF THE DRAWINGS

Other characteristics and advantages of the invention will emerge during the following description of one of its versions, given as a non-restrictive example, with reference to the appended drawings.

In the drawings.

MORE DETAILED DESCRIPTION

In the different figures, the same references denote identical or similar components.

Figure 1:
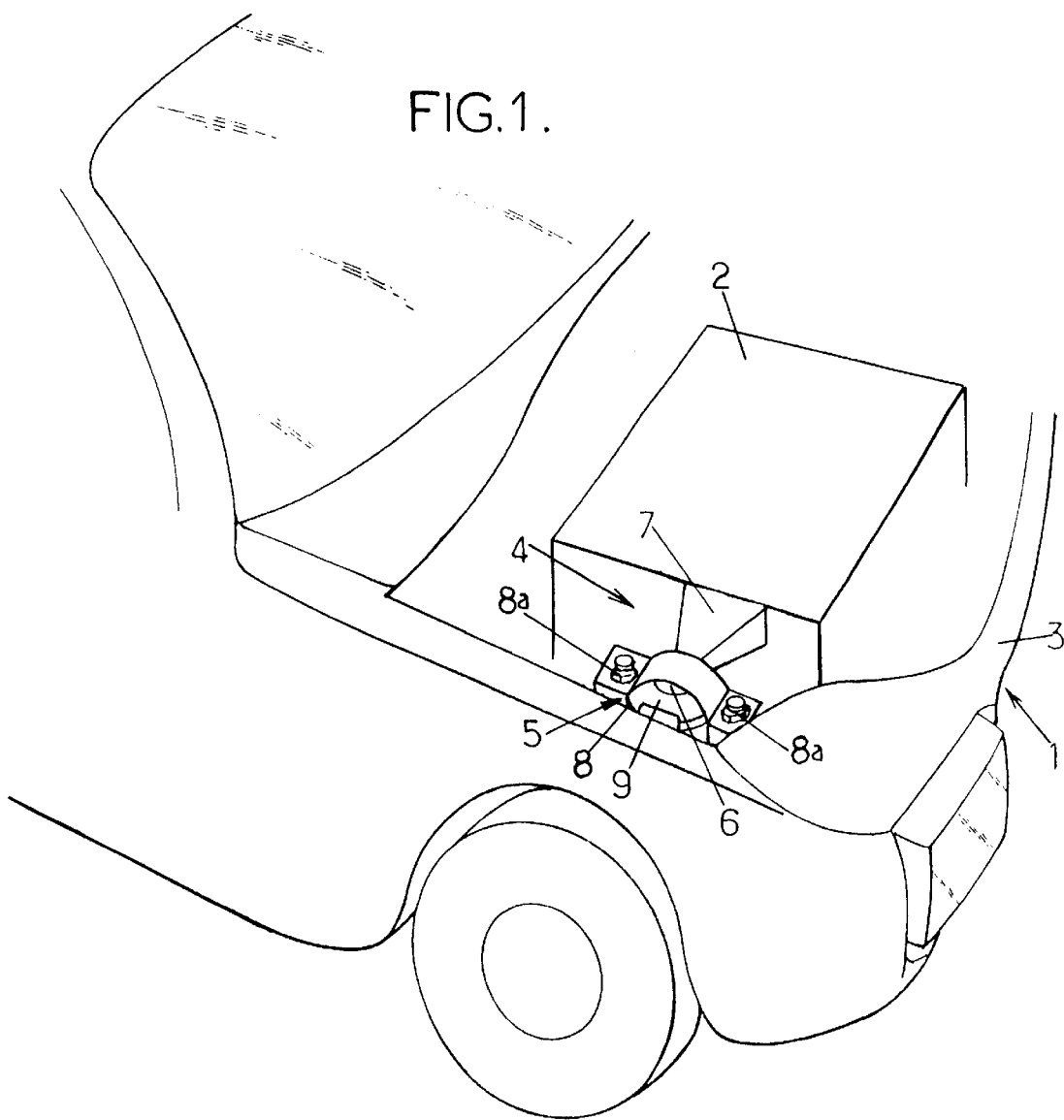
FIG. 1 is a diagrammatic view showing an automobile vehicle fitted with a hydraulic anti-vibration support according to one version of the invention.

The invention applies preferably, but not exclusively, to an automobile vehicle 1 comprising an engine unit 2 which is supported on the vehicle sub-frame 3 by means of several fixing devices, one of which can be seen in FIG. 1.

This fixing device 4 includes a hydraulic anti-vibration support 5 which has:

a first rigid metal armature 6, fixed to a rigid metal support arm 7 which is fixed to the engine unit 2, a second rigid metal armature 8, fixed to the sub-frame 3 by screws 8a or the like, and an elastomer body 9 connecting the two armatures 6 and 8 to each other.

Figure 2:
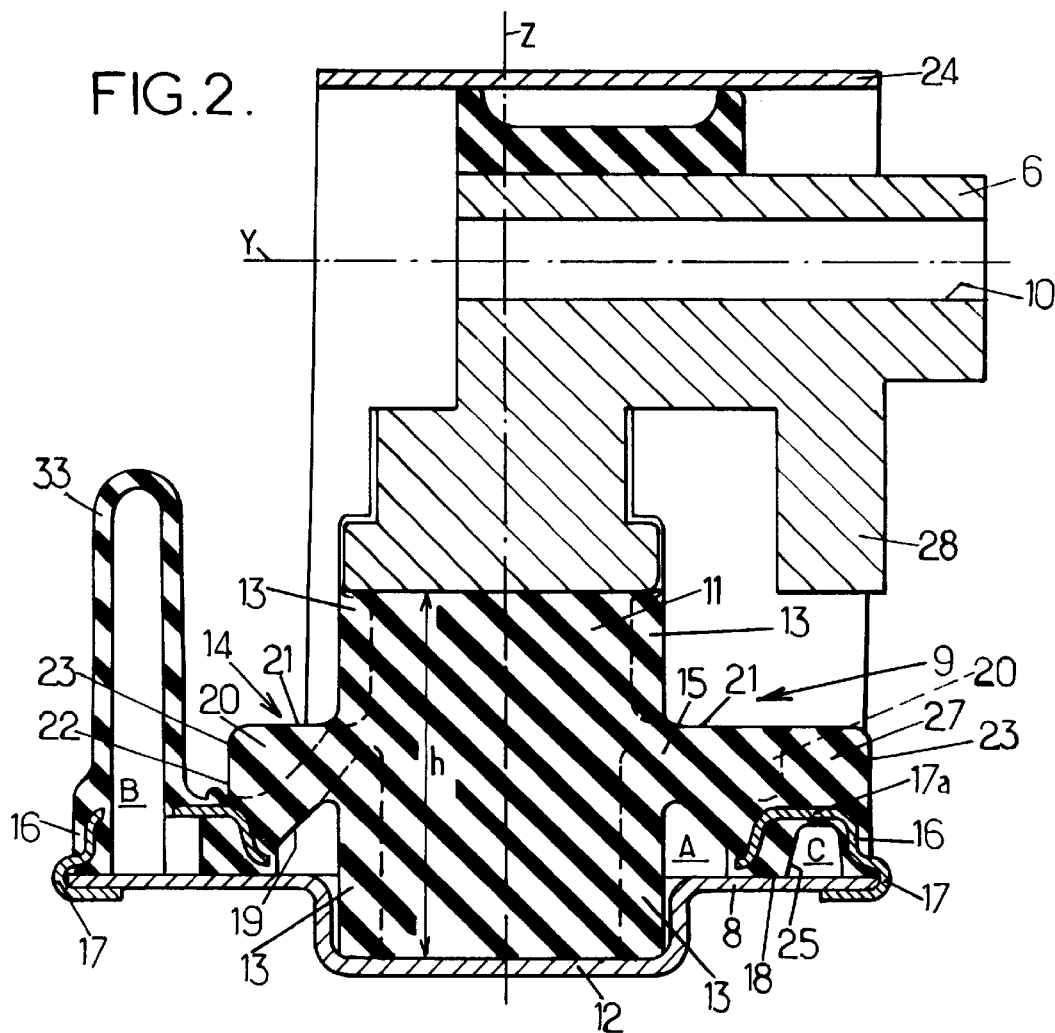
FIG. 2 is a vertical sectional view of the anti-vibration support fitted to the vehicle in FIG. 1, when no load is applied to this support.
Figure 3:
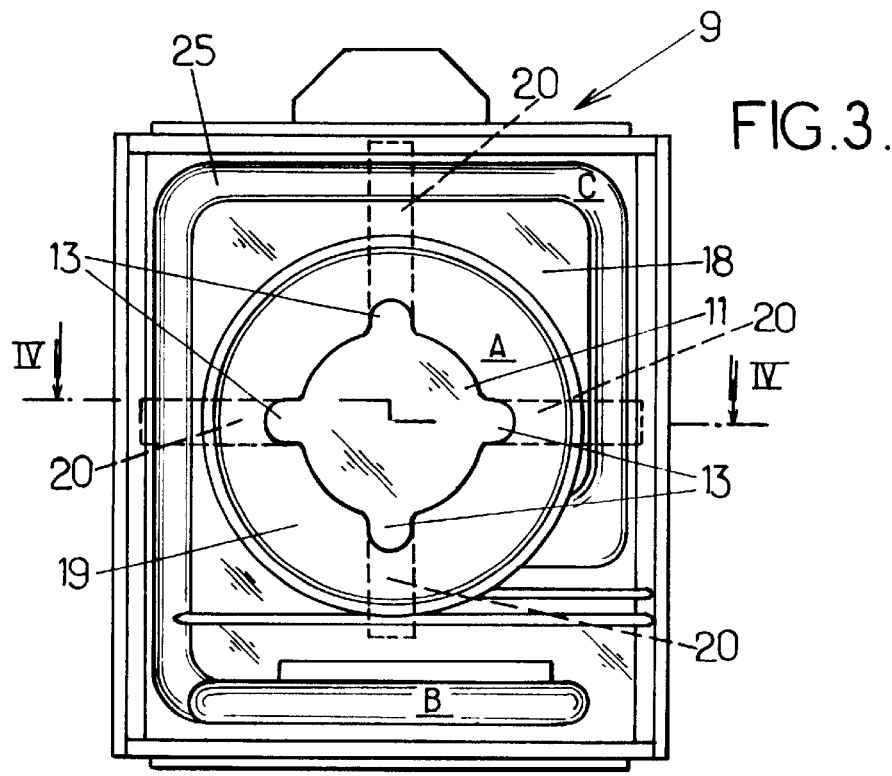
FIG. 3 is a view from underneath of the elastomer body belonging to the anti-vibration support in FIG. 2.
Figure 4:
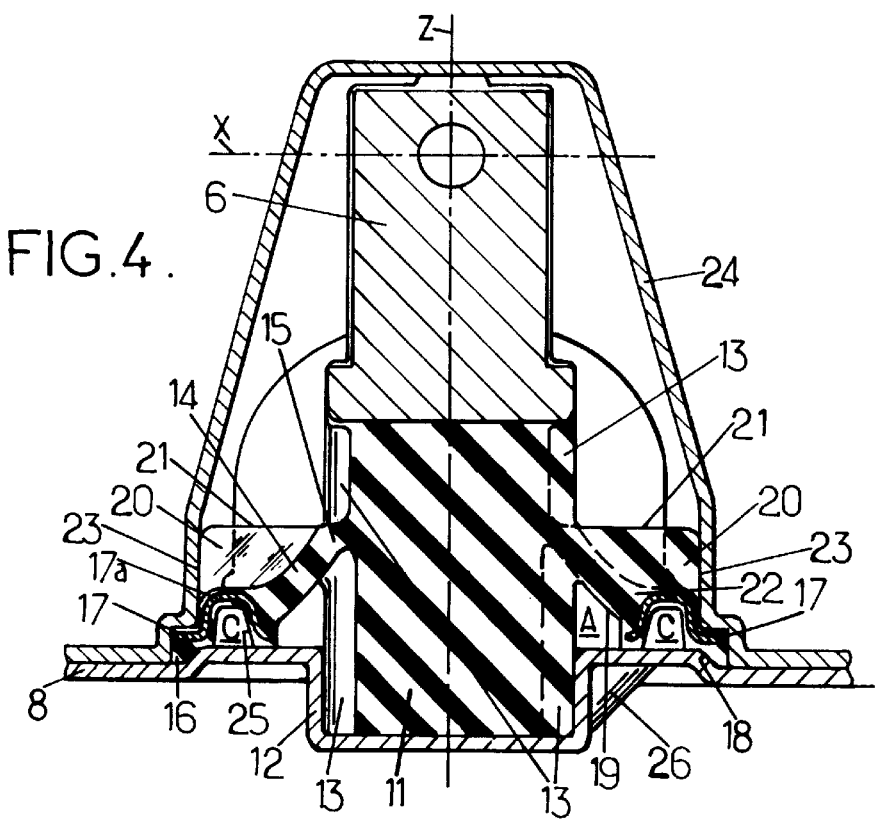
FIG. 4 is a vertical sectional view of the anti-vibration support in FIG. 2, the cross-section being taken along the broken line IV—IV in FIG. 3.

As shown in more detail in FIGS. 2 to 4, the first armature 6 comprises a bore 10 which enables said armature to be fixed to the above-mentioned arm 7, this bore 10 extending along an approximately horizontal axis Y.

As for the second armature 8, it is in the form of a support plate or baseplate of generally plane shape, extending perpendicularly to a vertical central axis Z which shows, on the one hand, the direction of application of the engine unit weight on the first armature, and on the other hand, the main direction of the vibrations which are to be dampened by the anti-vibration support 5.

Furthermore, the elastomer body 9 is moulded into a single piece and comprises firstly a central foot 11 extending vertically from the first armature 6 to the support plate 8, engaging in a trough 12 stamped at the centre of said plate.

The central foot 11 comprises, in the example considered, four vertical round ridged ribs 13 (possibly 3 in number, or more generally from 2 to 6), which project radially outwards and which are distributed around said central foot, so as to rigidify this central foot with respect to bending and to centre said foot in the trough 12.

The central foot 11 has, between the first armature 6 and the support plate 8, a certain free height h and a certain equivalent diameter d such that the h/d ratio is less than 2·5, to advantage less than 2. The equivalent diameter d has the value $d=2(S/\pi)^{1/2}$, where S is the average area of the horizontal section of the central foot (including the ribs 13).

Moreover the elastomer body 9 additionally comprises a bell-shaped side wall 14 extending between on the one hand, a top 15 fixed to the central foot 11, in an intermediate position on the upper part of said foot, and on the other hand, an annular base 16 of the elastomer body which is reinforced by a rigid metal plate 17. This plate 17 is crimped on the edge of the support plate 8, so that the lower face 18 of the annular base is applied in a sealed way against the upper face of said support plate 8.

The side wall 14 thus defines, between its lower tapered face 19 and the support plate 8, a work chamber A filled with liquid.

Moreover this side wall 14 has, in the example considered, four reinforcement ribs 20 placed in correspondence with the ribs 13, which project radially outwards and which each extend in a vertical plane between an upper end 21 integral with the top of the side wall 14 and a lower end 22 integral with the base 16 of the elastomer body. These ribs 20 are separated from each other by thinner portions of the side wall 14. The ribs 20 could possibly be 3 in number, or more generally from 2 to 6.

As can be seen particularly in FIG. 4, the upper end 21 of each reinforcement rib 20 forms an approximately horizontal upper face, which extends radially outwards from the central foot 11 to an outer face 23 extending approximately vertically.

The reinforcement ribs 20 enable the side wall 14 to be rigidified in the horizontal plane, so as to prevent the central foot 11 from keeling over when the first and second armatures 6,8 are subjected to relative horizontal movements.

In the example considered, this rigidification effect in the horizontal plane is especially significant parallel to a horizontal axis X which is perpendicular to the above-mentioned axes Y and Z, since the two reinforcement ribs 20 which are aligned parallel to the axis X are framed by an arch-shaped rigid cowl 24 which is fixed to the support plate 8 and which reduces furthermore the clearances of the first armature 6. The vertical external faces 23 of these two reinforcement ribs thus form stop faces which are supported horizontally on said cowl 24.

Furthermore, the elastomer body 9 additionally comprises a thin and easily bendable wall 33 which also has a bell shape open downwards and which extends from a top to the base 16 of the elastomer body, delimiting with the support plate 8 a surge chamber B filled with liquid.

In the lower face 18 of the elastomer body base a groove 25 has also been cut delimiting with the support plate 8 a choked channel C the shape of which is at least partially defined by a sunken face 17a of the cut out plate 17.

This choked channel communicates with the work chamber A and surge chamber B, communication with the work chamber A being achieved by means of a sunken face 26 provided in the support plate 8 (see FIG. 4).

Lastly, in the particular version shown in the drawings, the elastomer body 9 comprises a relatively solid boss 27 which engages with a stop 28 projecting downwards from the first armature 6 to reduce the downward clearances of said first armature.

To advantage, the reinforcement rib 20 placed in correspondence with the boss 27 extends to this boss, a fact which increases the horizontal rigidity of this reinforcement rib.

The device which has just been described operates as follows.

Figure 5:
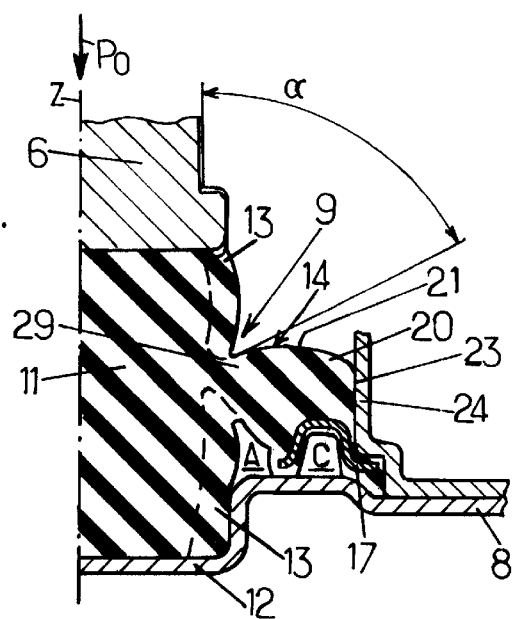
FIG. 5 is a partial view similar to FIG. 4, showing the anti-vibration support when a continuous vertical load is applied.

When the engine unit weight is applied to the first armature 6, the central foot 11 of the anti-vibration support is compressed axially without buckling, i.e. without losing its radial rigidity characteristics, as shown in FIG. 5.

On the other hand, the elastomer body side wall 14 is compressed vertically to its buckling point, i.e. to a point where its axial rigidity (local gradient of the force—displacement curve) becomes approximately zero.

This buckling phenomenon, the usefulness of which will be seen below, can occur despite the presence of the reinforcement ribs 21:

because these reinforcement ribs are connected to the central foot 11 by a radially internal part 29 which has a relatively slight vertical thickness, this thickness increasing radially outwards from said internal portion, and because the inner part 29 of the ribs 20 tends to coil up on itself against the central foot 11 dipping towards the support plate 8 when the drive unit weight is applied, forming locally an acute angle a between the upper end 21 of the rib and the axis Z, this coiling effect making it possible to obtain a slight, and to advantage approximately zero, vertical rigidity of the ribs 20.

Figure 6:
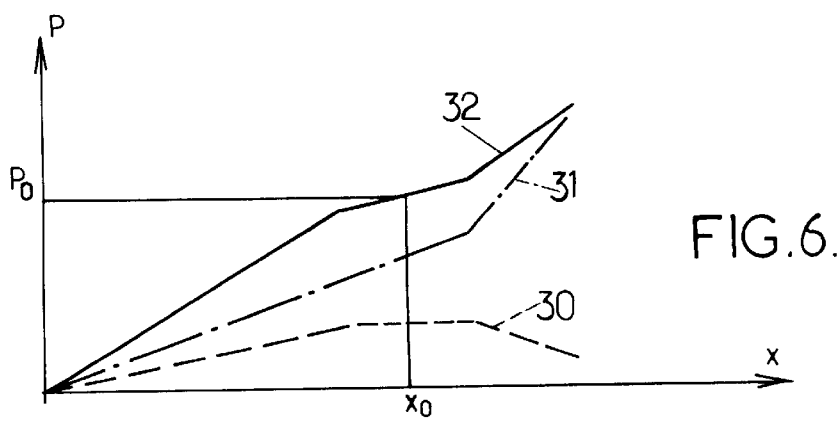
FIG. 6 is a graph showing the relation between the axial force P applied to the support in FIGS. 2 and 5 and the axial compression X of this support.

The buckling phenomenon to which the side wall 14 is subjected is illustrated by the graph shown in FIG. 6, which shows three curves 30, 31, 32 representing respectively the relation between the axial force P applied to the first armature and the downward axial displacement x of the first armature, respectively for the side wall 14 alone (curve 30), for the central foot 11 alone (curve 31) and for the whole elastomer body 9 (curve 32).

The curve 30 [$P1(x)$] relating to the side wall 14 initially comprises a rising linear part, then an approximately horizontal plateau corresponding to the buckling of the side wall 14 (the side wall 14 then has approximately zero vertical rigidity $dP1/dx$, but can still bear some vertical force), then a falling part.

On the other hand, the curve 31 [$P2(x)$] relating to the foot 11 only comprises a first rising linear part which extends at least to the end of the horizontal plateau of the curve 30, then a second rising linear part with a very considerable gradient, corresponding to the confinement rigidity of the central foot 11.

Lastly, the curve 32 relating to the whole anti-vibration support, corresponds to a function $P(x)=P1(x)+P2(x)$.

This curve 32 has:

a linear initial part having a relatively steep gradient, i.e. corresponding to a relatively high rigidity ($dP/dx$), for example of about 150 N/mm, a linear intermediate part corresponding to the plateau of the curve 30 and which has a relatively low gradient, i.e. corresponding to a low rigidity for example of about 80 N/mm, and lastly a linear end part of steep gradient, corresponding to the second part of the curve 31.

When the engine unit weight is applied to the anti-vibration support 5, which equates to the application of a continuous load P0 of for example between 500 and 2500 N (Newton), said support is subjected to a compression x0 such that the co-ordinate point (p0, x0) is located on the intermediate part of the curve 32, of low gradient.

In other words, when the engine unit weight is applied to the anti-vibration support, the side wall 14, which is in a state of buckling, takes up again a part of the force P0, but no longer participates in the axial rigidity of the anti-vibration support with respect to the vertical vibrations to which this support is subjected around its balance point.

This low dynamic rigidity enables excellent absorption of relatively high frequency vibrations, particularly in the acoustic area.

Furthermore, the anti-vibration support 5 dampens the relatively low frequency (for example less than 20 Hz) and relatively high amplitude (for example above 1 mm) vibrations between the drive unit 2 and sub-frame 3 of the vehicle, by transferring liquid between the work chamber A and the surge chamber B through the choked passage C, as is well known in the prior art.

We claim:

1. An anti-vibration support intended to be interposed between two rigid components to dampen and attenuate vibrations between these two components along a vertical central axis and to support a continuous vertical load, exerted by one of these two components, this support comprising:

first and second rigid armatures, intended to be fixed respectively to the two rigid components to be connected, and an elastomer body connecting the two armatures to each other, this elastomer body having a bell-shaped side wall extending axially by diverging from a top integral with the first armature to an annular base integral with the second armature, a rigid baseplate integral with the second armature extending to the centre of said elastomer body annular base, wherein the elastomer body comprises a central foot extending vertically to the centre of the side wall from the first armature to the contact with the baseplate, and wherein said elastomer body side wall is more flexible than the central foot in the vertical direction, this side wall comprising from 2 to 6 reinforcement ribs which extend radially outwards each in a vertical plane and which are distributed angularly around the side wall, these reinforcement ribs being separated from each other by thinner and flexible portions belonging to said side wall.

2. An anti-vibration support according to claim 1, wherein the reinforcement ribs are sized so as to prevent the central foot from keeling over without markedly increasing the vertical rigidity of the support.

3. An anti-vibration support according to claim 1, wherein the central foot is sized so as not to buckle when the continuous vertical load is applied to the anti-vibration support, the elastomer body side wall being sized to withstand buckling when the anti-vibration support bears said continuous vertical load and in this event to have approximately zero rigidity in the vertical direction.

4. An anti-vibration support according to claim 1, wherein each of the reinforcement ribs extends between an upper end integral with the top of the side wall and a lower end which is fixed to the second armature.

5. An anti-vibration support according to claim 1, wherein each reinforcement rib is sized so that, when the anti-vibration support bears the continuous vertical load, the upper end of said rib bends with a tendency to coil up partially on itself to dip towards the second armature.

6. An anti-vibration support according to claim 1, wherein each reinforcement rib is sized so that, when the anti-vibration support bears the continuous vertical load, the upper end of said reinforcement rib forms locally an acute angle with the central axis, near the top of the side wall.

7. An anti-vibration support according to claim 1, wherein the elastomer body side wall has an inner surface extending at an angle radially outwards and downwards from the central foot of the elastomer body, and each reinforcement rib has a vertical thickness, between said inner surface and the upper end of said reinforcement rib, which grows radially outwards from the central foot.

8. An anti-vibration support according to claim 1, wherein at least one of the reinforcement ribs has a stop face which is orientated radially outwards, this stop face being adapted to engage with a rigid counter stop which is integral with the second armature.

9. An anti-vibration support according to claim 1, wherein the central foot of the elastomer body has vertical ribs distributed angularly around said foot, which project radially outwards.

10. An anti-vibration support according to claim 9, wherein each vertical rib of the foot extends from the top of the elastomer body side wall to the baseplate.

11. An anti-vibration support according to claim 9, wherein the vertical ribs of the central foot are placed in correspondence with the reinforcement ribs of the elastomer body side wall.

12. An anti-vibration support according to claim 9, wherein the baseplate forms an upwardly open trough which receives the central foot of the elastomer body, this central foot being centred in the trough by means of said vertical ribs.

13. An anti-vibration support according to claim 9, wherein the central foot extends upwards with its vertical ribs beyond the top of the elastomer body side wall, as far as the first armature.

14. An anti-vibration support according to claim 1, wherein the elastomer body side wall delimits a work chamber which communicates, by means of a choked passage, with a surge chamber delimited by a flexible wall, the work chamber forming with the surge chamber and the choked passage a sealed volume filled with liquid.

15. An anti-vibration support according to claim 14, wherein the baseplate forms the second armature and the elastomer body includes the flexible wall of the surge chamber, which is formed in a single piece with the bell-shaped side wall and the central foot, this elastomer body being applied in a sealed way against the baseplate so as to delimit with it the work chamber, the surge chamber and the choked channel.

16. An anti-vibration support according to claim 1, wherein the central foot has, between the first armature and the baseplate, a certain free height h and a certain equivalent diameter d such that the h/d ratio is less than 2.5.

* * * * *